(12) United States Patent
Hiie

(10) Patent No.: US 8,380,868 B2
(45) Date of Patent: Feb. 19, 2013

(54) METHOD AND SYSTEM FOR DATA TRANSMISSION

(75) Inventor: Magnus Hiie, Tartu (EE)

(73) Assignee: Skype, Dublin (IE)

( * ) Notice: Subject to any disclaimer, the term of this patent is extended or adjusted under 35 U.S.C. 154(b) by 444 days.

(21) Appl. No.: 12/760,008

(22) Filed: Apr. 14, 2010

(65) Prior Publication Data

US 2010/0268840 A1 Oct. 21, 2010

(30) Foreign Application Priority Data

Apr. 14, 2009 (GB) .................................... 0906411.4

(51) Int. Cl.
*G06F 15/16* (2006.01)
(52) U.S. Cl. .......................... 709/231; 709/238; 713/150
(58) Field of Classification Search .................. 709/231, 709/224, 242, 238; 713/153, 150; 380/270; 705/51, 52; 725/9
See application file for complete search history.

(56) References Cited

U.S. PATENT DOCUMENTS

| | | | |
|---|---|---|---|
| 5,751,813 A * | 5/1998 | Dorenbos ..................... | 713/153 |
| 7,254,602 B1 | 8/2007 | Boivie | |
| 2007/0282749 A1 * | 12/2007 | Nonaka et al. .................. | 705/51 |
| 2008/0003941 A1 | 1/2008 | Milstein et al. | |
| 2008/0049937 A1 * | 2/2008 | Pauker et al. ................. | 380/270 |
| 2008/0133767 A1 * | 6/2008 | Birrer et al. .................... | 709/231 |
| 2008/0288410 A1 * | 11/2008 | Nino .............................. | 705/52 |
| 2009/0169021 A1 * | 7/2009 | Ushiyama ...................... | 380/279 |
| 2010/0095317 A1 * | 4/2010 | Toebes et al. ..................... | 725/9 |
| 2010/0125675 A1 * | 5/2010 | Richardson et al. .......... | 709/242 |
| 2011/0202652 A1 * | 8/2011 | Memon et al. ................ | 709/224 |

FOREIGN PATENT DOCUMENTS

| | | |
|---|---|---|
| WO | WO 97/34393 | 9/1997 |
| WO | WO 03/19860 A1 | 3/2003 |
| WO | WO 2004/100470 A1 | 11/2004 |
| WO | WO 2005/009019 A2 | 1/2005 |

OTHER PUBLICATIONS

Great Britain Search Report, GB0906411.4, date of mailing Jul. 21, 2009.

* cited by examiner

*Primary Examiner* — Jungwon Chang
(74) *Attorney, Agent, or Firm* — Wolfe-SBMC

(57) ABSTRACT

A method, program and system for transmitting a data stream to a group of recipient nodes from a source node via an intermediate node over a communication network, wherein the data stream is associated with a first unique identifier to identify the content of the data stream. The method includes the source node generating a second identifier, the second identifier distinct from the first unique identifier, and associating the second identifier with the data stream to identify that the data stream is to be received by the group of recipient nodes; transmitting routing information comprising the second identifier to the intermediate node; transmitting the data stream from the source node to the intermediate node; and responsive to receiving the data stream at the intermediate node, reading the second identifier and routing the data stream to the group of recipient nodes in accordance with the routing information.

30 Claims, 6 Drawing Sheets

METHOD AND SYSTEM FOR DATA TRANSMISSION

RELATED APPLICATION

This application claims priority under 35 U.S.C. §119 or 365 to Great Britain, Application No. 0906411.4, filed Apr. 14, 2009. The entire teachings of the above application are incorporated herein by reference.

TECHNICAL FIELD

This invention relates to a method and system for data transmission.

BACKGROUND

Packet-based communication systems allow the user of a device, such as a personal computer, to communicate across a computer network such as the internet. Packet-based communication systems provide features to the user such as voice over internet protocol ("VoIP") calling, video calling, file transfer, instant messaging ("IM"), and voicemail. These systems are beneficial to the user as they are often of significantly lower cost than fixed line or mobile networks. This may particularly be the case for long-distance communication. To use a packet based communication system, the user must install and execute communication client software on their user terminal. The communication client software provides the VoIP connections as well as other functions such as registration and authentication.

One type of packet-based communication system uses a peer-to-peer ("P2P") overlay network topology operating on the internet. To enable access to a peer-to-peer system, the user must execute P2P client software provided by a P2P software provider on their user terminal, and register with the P2P system. When the user registers with the P2P system the client software is provided with a digital certificate from a server. Once the client software has been provided with the certificate, communication can subsequently be set-up and routed between user terminals of the P2P system without the further use of a server. The network address of a destination user terminal can be found by the client software accessing a P2P database distributed across other user terminals of the P2P system. Once the network address of the destination user terminal is known, the calling user terminal can exchange of one or more digital certificates with the destination user terminal. The exchange of the digital certificates between the user terminals provides proof of the users' identities and that they are suitably authorized and authenticated in the P2P system. Therefore, the presentation of digital certificates provides trust in the identity of the user. It is therefore a characteristic of peer-to-peer communication that the communication can be established and proceeds without using a server, by operating from end-user terminal to end-user terminal with support provided by other end-user terminals of the P2P system. Further details on such a P2P system are disclosed in WO 2005/009019.

SUMMARY

A problem with packet-based communication systems is that they are not well optimized for the delivery of data (in the form of, for example, video or voice calls or file transfers) to groups of user terminals. Typically, packet-based communication systems operate by establishing multiple one-to-one connections directly with each of the user terminals in the group. This gives rise to significant resource demands at the source user terminal, in terms of available bandwidth and processing.

Furthermore, in packet-based communication systems it becomes possible for data to be sent to a group of user terminals, and this data to then be "republished" by one or more of the recipients in the group to a new group of user terminals. Therefore, multiple (potentially overlapping) groups of user terminals can be created, each of which are consuming the same data. It consequently becomes increasingly difficult to manage the data being distributed over a number of nodes by multiple publishing user terminals, each to a different group, whilst maintaining the privacy requirements of each of the participants in each of the groups.

There is therefore a need for a technique to address the aforementioned problems with the distribution of data to groups of user terminals in a packet-based communication system.

According to one aspect of the present invention there is provided a method of transmitting a data stream to a group of recipient nodes from a source node via an intermediate node over a communication network, wherein the data stream is associated with a first unique identifier to identify the content of the data stream, the method comprising: the source node generating a second identifier, the second identifier distinct from the first unique identifier, and associating the second identifier with the data stream to identify that the data stream is to be received by the group of recipient nodes; transmitting routing information comprising the second identifier to the intermediate node; transmitting the data stream from the source node to the intermediate node; and responsive to receiving the data stream at the intermediate node, reading the second identifier and routing the data stream to the group of recipient nodes in accordance with the routing information.

Because a second identifier is generated which is distinct from the first identifier, this enables the second identifier to identify the group of end-user nodes receiving the data stream, i.e., the audience of the data stream, whilst maintaining the first identifier, which identifies the content of the data stream. This allows the same content to be consistently and uniquely identified regardless of how many times it is republished to different groups of end-user nodes at different times. Therefore, the audience of the data stream can be identified and managed independently of the content.

Furthermore, because the intermediate node is only provided with the second identifier, and only reads the second identifier associated with the data stream, the first identifier is not known to the intermediate node. As the second identifier is distinct from the first identifier, this prevents the intermediate node from knowing the identity of the stream that is being sent to the group of end-user nodes. Therefore, as the intermediate node may not be a participant in the group of end-user nodes, this maintains the privacy of the end-user nodes to which the data stream is being routed.

The recipient nodes may be end-user nodes. The intermediate node may be an end-user node. The source node may be an end-user node. Alternatively, the intermediate node and/or source node may be a server.

In embodiments, the method may further comprise the source end-user node encrypting the data stream using an encryption key prior to associating the second identifier with the data stream, so that the second identifier remains unencrypted.

Because the data stream is preferably encrypted by the source node, the intermediate node is unable to read either the content of the data stream or the first identifier in the data stream. The intermediate node does not have access to the encryption key. This increases the security and privacy of the transmission of the data stream. However, as the second identifier is unencrypted, this can be read by the intermediate node and used to route the data stream.

In addition, because the second identifier (which identifies the group of nodes receiving the data stream) is preferably unencrypted, whilst the first identifier (identifying the content of the data stream) is encrypted, privacy can be maintained in the case of the same data being sent to two separate audiences. The participants of a first audience are not able to determine the participants of a second audience receiving the same data stream as only the second identifier can be read, due to being unencrypted, and this is distinct from the first identifier.

The method may further comprise the source node transmitting the encryption key to the group of recipient nodes.

The method may further comprise the group of recipient nodes decrypting the data stream using the encryption key responsive to receiving the data stream from the intermediate node.

Because the recipient nodes are preferably provided with the encryption key, they are able to decrypt the data stream to access the first identifier and the content of the data stream.

In embodiments, the second identifier may be generated by the source node using a function having the first unique identifier as a first input.

The function may further have the encryption key as a second input.

The function may be a one-way function, such that the first identifier cannot be derived from the second identifier.

The one-way function may be a hash function.

Because the second identity is preferably generated using a one-way function, the first identifier cannot be derived from the second identifier. This ensures that the intermediate node is not able to derive the first unique identity from the second identity, thereby preserving the privacy requirements of the recipient nodes.

Furthermore, because the function preferably has a second input (the encryption key) which is known only to the members of a given audience, members of another audience who are receiving the same data stream are not able to derive the second identifier from the first identifier (which is known to the members of the other audience as they are receiving the same content). This maintains privacy between separate audiences receiving the same data.

In embodiments, the method may further comprise transmitting the first unique identifier to the group of recipient nodes.

Transmitting the first unique identifier to the group of recipient nodes may comprise the source node transmitting the first unique identifier to the group of recipient nodes over individual secure channels separately to the transmission of the data stream.

The secure channels may be call-establishment channels.

Transmitting the first unique identifier to the group of recipient nodes may comprise the source node transmitting the first unique identifier to the group of recipient nodes over a secure multicast channel separately to the transmission of the data stream.

The secure multicast channel may be an instant messaging channel.

The method may further comprise responsive to receiving the first unique identifier at the group of recipient nodes, each of the recipient nodes determining whether a pre-existing data stream having the first identifier is already stored, and, if so, the respective recipient node sending a message to the source node such that the data stream is not transmitted to the respective recipient node.

The method may further comprise one of the recipient nodes selecting to re-transmit the data stream to a group of further recipient nodes; the one of the recipient nodes generating a third identifier, wherein the third identifier is distinct from both the first unique identifier and second identifier, associating the third identifier with the data stream to identify that the data stream is to be received by the group of further recipient nodes; transmitting further routing information comprising the third identifier to a further intermediate node; transmitting the data stream comprising the third identifier from the one of the recipient nodes to the further intermediate node; and responsive to receiving the data stream at the further intermediate node, reading the third identifier and routing the data stream to the group of further recipient nodes in accordance with the further routing information.

Each of the source node, the intermediate node and the group of recipient nodes may be user terminals executing a communication client application.

The data stream may comprise at least one of: video data; audio data; image data; and text data.

The communication network may be an overlay network operating on the internet. The communication network may be a peer-to-peer overlay network.

According to another aspect of the present invention, there is provided a communication client program product comprising program code means which when executed on a end-user node in a network of interconnectable end-user nodes is arranged operate in conjunction with like communication client programs running on other end-user nodes of the network to perform the steps of the method of any preceding claim.

According to another aspect of the present invention, there is provided a system for transmitting a data stream over a communication network, the data stream being associated with a first unique identifier to identify the content of the data stream, the system comprising: a source node; a group of recipient nodes; and an intermediate node; where the source node is arranged to generate a second identifier, the second identifier distinct from the first unique identifier, associate the second identifier with the data stream to identify that the data stream is to be received by the group of recipient nodes, transmit routing information comprising the second identifier to the intermediate node, and transmit the data stream to the intermediate node; where the intermediate node is arranged to receive routing information comprising the second identifier, and, responsive to receiving the data stream, read the second identifier and route the data stream to the group of recipient nodes in accordance with the routing information.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
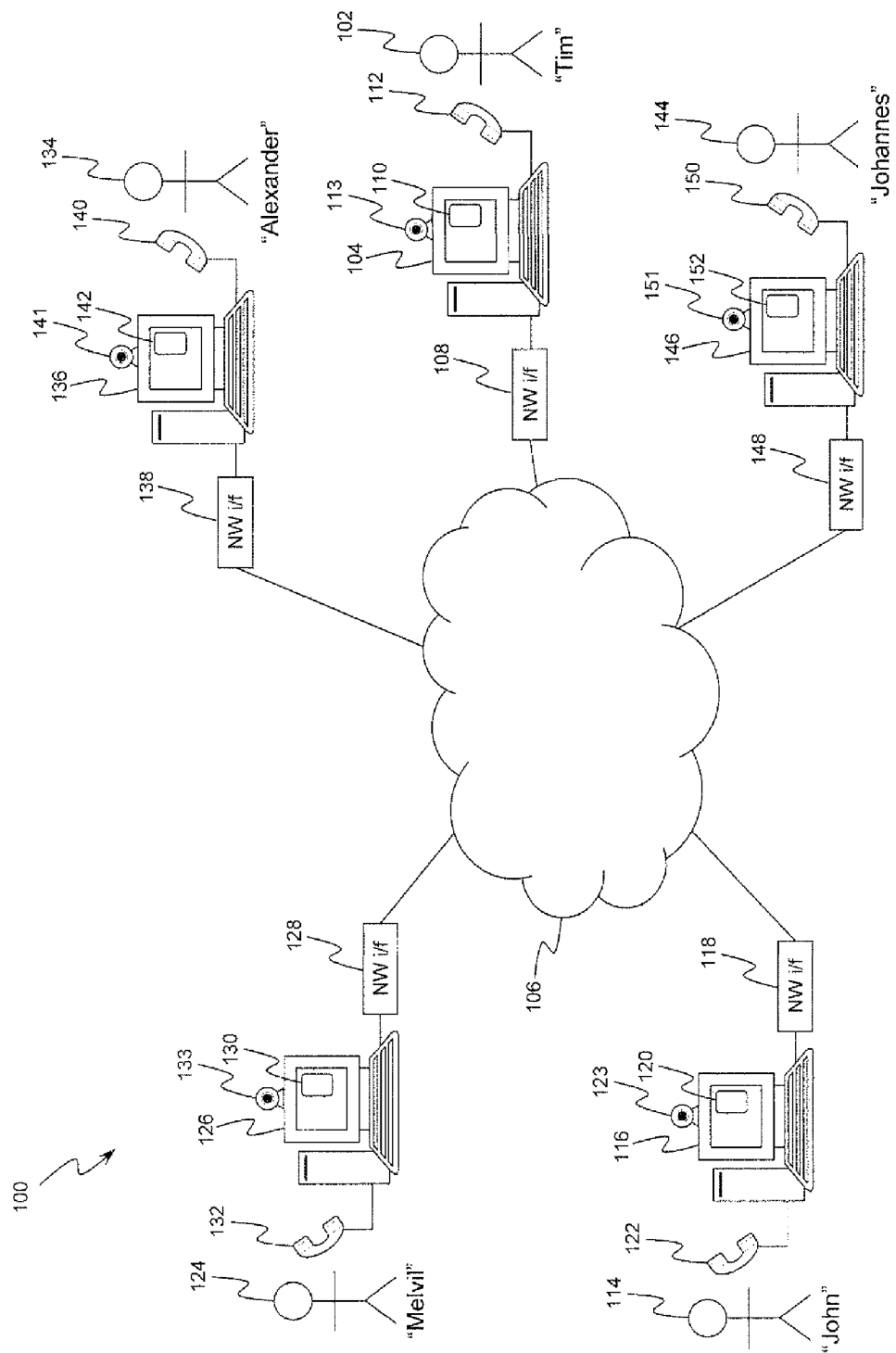
FIG. 1 shows a packet-based communication system.

Reference is first made to FIG. 1, which illustrates a packet-based communication system 100. Note that whilst this illustrative embodiment is described with reference to a P2P overlay network, other types of communication system could also be used, such as non-P2P, VoIP, IM or file transfer systems. A first user 102 of the communication system (named "Tim") operates a user terminal 104 which is able to connect to a network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. Preferably, the user device comprises a display such as a screen and an input device such as a keyboard, mouse, joystick and/or touch-screen. The user device 104 is connected to the network 106 via a network interface 108 such as a modem, and the connection between the user terminal 104 and the network interface 108 can be via a cable (wired) connection or a wireless connection. Note that in alternative embodiments, the user terminal 104 can connect to the communication network 106 via additional intermediate networks not shown in FIG. 1.

The user terminal 104 is running a communication client 110, provided by the packed-based communication system software provider. The communication client 110 is an application layer software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself. The user terminal 104 is further connected to a webcam 113 for providing video data, for example for use in video calls.

Figure 2:
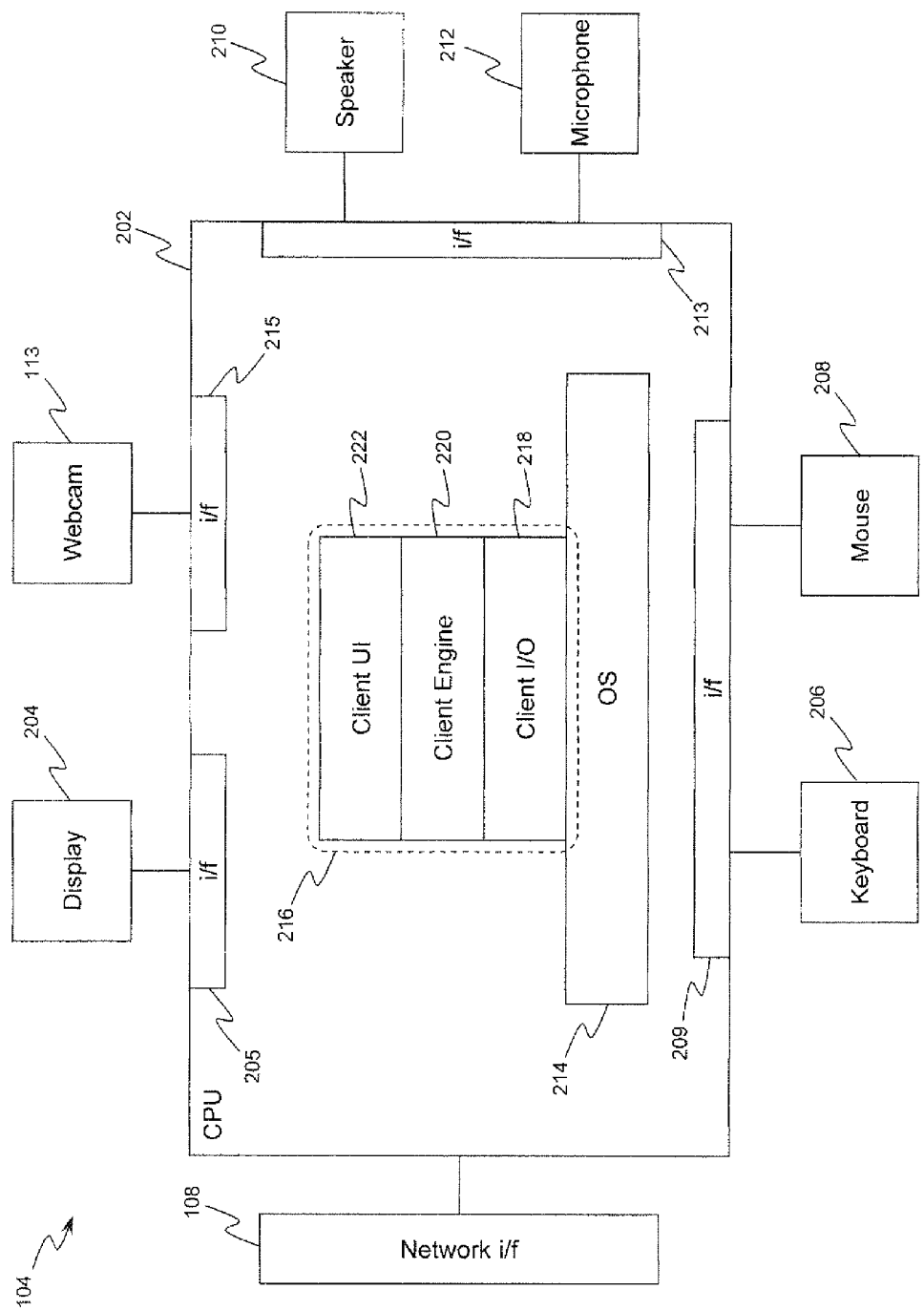
FIG. 2 shows the structure of a user terminal in the packet-based communication system.

FIG. 2 illustrates a detailed view of the user terminal 104 on which is executed client 110. The user terminal 104 comprises a central processing unit ("CPU") 202, to which is connected a display 204 such as a screen via a display interface 205, an input device such as a keyboard 206 and a pointing device such as a mouse 208 connected via an interface 209 such as USB. In alternative terminals, the input devices and pointing device can be integrated into the terminal, such as a keypad, touch-screen and/or joystick. An output audio device 210 (e.g. a speaker) and an input audio device 212 (e.g. a microphone) are connected via an audio interface 213. The output audio device 210 and input audio device 212 may be integrated into a handset 112 or headset, or may be separate. The CPU 202 is connected to the network interface 108. The CPU 202 is also connected to the webcam 113 via interface 215, for use in video calls.

FIG. 2 also illustrates an operating system ("OS") 214 executed on the CPU 202. Running on top of the OS 214 is a software stack 216 for the client 110. The software stack shows a client I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 108. With reference to the TCP/IP model, the operating system implements the transport, internet, and (optionally) a portion of the link layer, with the remainder of the link layer being implemented in firmware at the user terminal 104. The communication client 110 operates at the application layer. The client I/O layer 218 of the client software communicates with the operating system 214 and handles voice and video coding and manages the signaling and data connections over the communication system. Higher level functionality is provided by the client engine layer 220, including, for example, handling presence, relaying, user address look-up and authentication. The client engine 220 also communicates with the client user interface layer 222. The client engine 220 may be arranged to control the client user interface layer 222 to present information to the user via the user interface of the client (as shown in FIG. 2) and to receive information from the user via the user interface.

Figure 3:
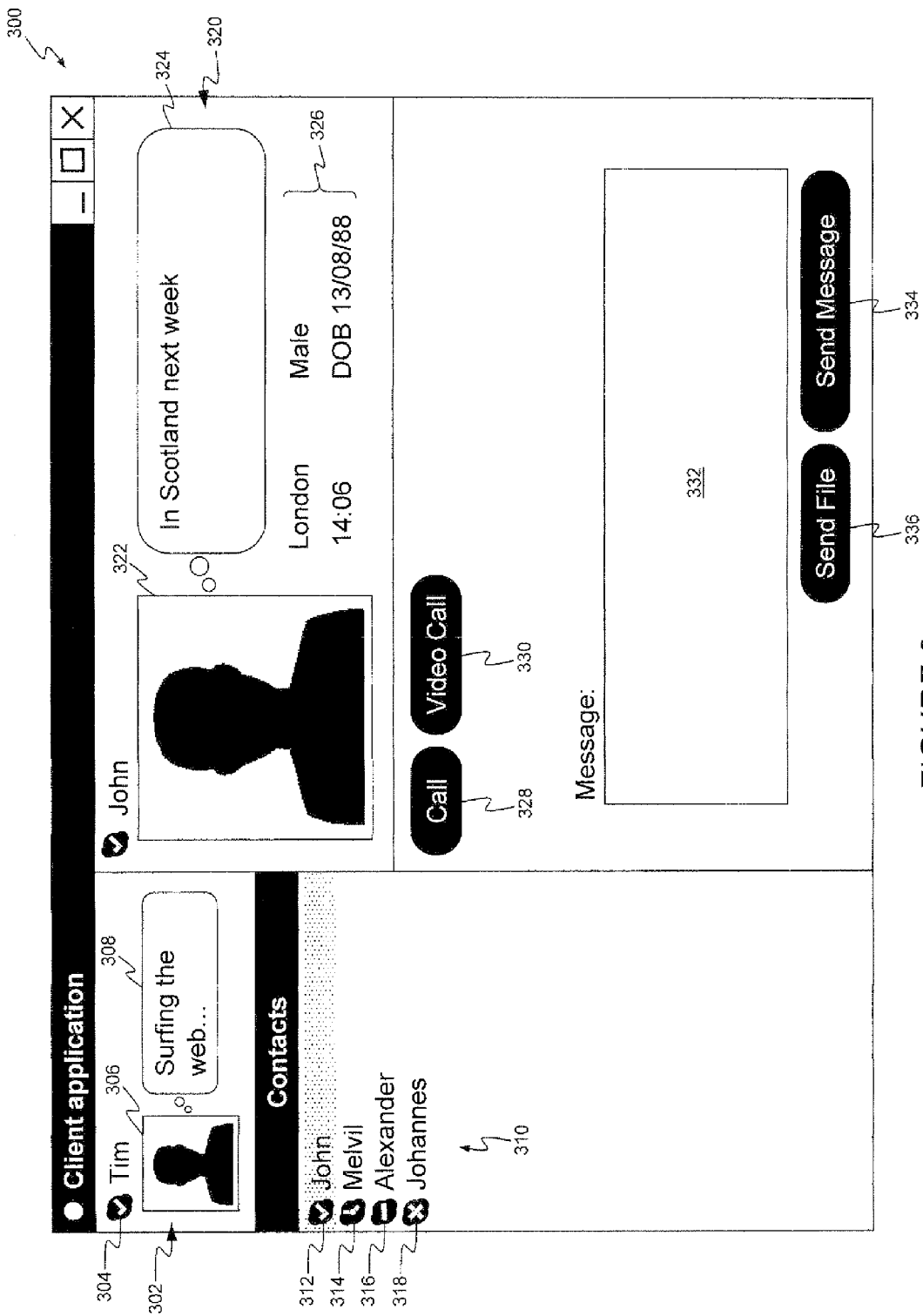
FIG. 3 shows a user interface of a communication client in the packet-based communication system.

An example of a user interface 300 of the communication client 110 executed on the user terminal 104 of the first user 102 is shown illustrated in FIG. 3. Note that the user interface 300 can be different depending on the type of user terminal 104. For example, the user interface can be smaller or display information differently on a mobile device, due to the small screen size. In the example of FIG. 3, the client user interface 300 displays user information 302 for "Tim" 102 in the communication system. This shows the user-defined presence state icon 304 (that will be seen by other users), the user's avatar 306 and mood message 308.

The client user interface 300 comprises a contact list 310 showing the contacts stored by the user 102. In the example user interface in FIG. 3, four contacts of other users of the communication system are shown listed in contact list 310. Each contact in the contact list has a name and a presence state chosen by the contact associated with it, and each of these contacts have authorized the user of the client to view their contact details and the contact-defined presence information. For example, the presence status icon for "John" 312 indicates that this contact is "online", the presence icon for "Melvil" 314 indicates that this contact is "away", the presence icon for "Alexander" 316 indicates that this contact's state is "do not disturb" ("DND"), the presence icon for "Johannes" 318 indicates that this contact is "offline". Further presence state indications can also be included.

When a contact in the contact list 310 is selected (for example "John"), then corresponding profile information 320 is displayed for this contact. The profile information includes, for example, the contact's avatar 322, mood message 324 and personal details 326.

VoIP calls to the selected user in the contact list 310 can be initiated over the communication system by selecting the contact and clicking on a "call" button 328 using a pointing device such as a mouse. Similarly, a video call can be initiated by selecting the contact and clicking on a "video call" button 330. In addition to making real-time calls (voice or video), the user of the client 110 can also communicate with the users listed in the contact list 310 in several other ways. For example, the user 102 can type an IM message in the message field 332, and send the IM message to the selected contact using the "send message" button 334. Furthermore, the user 102 can use the client 110 to transmit documents or files to users in the contact list 310, by selecting a contact and clicking on the "send file" button 336.

In this exemplary embodiment, the process for establishing a connection between user terminals is similar for each of the above-mentioned types of communication (i.e. calls, messages or file transfer). The connection set-up is performed using proprietary protocols, and is established over the network 106 between the calling user and called user by the peer-to-peer system without the use of central servers.

Described below is an illustrative example of the communication process in which the calling user "Tim" 102 establishes a voice call with a second user "John" 114. The process is similar for e.g. video calls and file transfer.

After looking-up the network address of the called user terminal in a distributed P2P database, and following authentication through the presentation of digital certificates (to prove that the users are genuine subscribers of the communication system—described in more detail in WO 2005/009019), the call can be made using VoIP. The client 110 performs the encoding and packetization voice data into VoIP packets. VoIP packets from the user terminal 104 are transmitted into the network 106, and routed to a user terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112. Similarly, video data can be captured by a webcam 123, encoded by the client 120 and transmitted to the user terminal 104.

Due to the P2P nature of the system illustrated in FIG. 1, the actual calls between users of the communication system can be made with no central servers being used. This has the advantages that the network scales easily and maintains a high voice quality, and the call can be made free to the users.

In the case of one-to-one communication, such as outlined above, the network resources and user privacy are relatively straightforward to manage, as the data is simply sent over a single communications link between the user terminals. Even in the case that the data needs to be sent via a relay node (sometimes needed for firewall or network address translation ("NAT") traversal) user privacy is maintained, as end-to-end encryption of the data prevents the data being read by the intermediate relay node. Network resources can be managed as if a single link was present between the user terminals, regardless of whether a relay node is present between them.

However, it is desirable to offer one-to-many communications between the users of the packet-based communication system. One-to-many communications give rise to significant problems, particularly in terms of content management, network management and privacy.

For example, consider, with reference to FIG. 1, the following multi-party communication scenario. User "Tim" 102 wishes to send a data stream (for example video data or a file transfer) to multiple participants. In this scenario, the desired recipients of the data stream are the user "John" 114, user "Melvil" 124 (operating a user terminal 126 connected via network interface 128, executing client application 130 and connected to handset 132 and webcam 133), user "Alexander" 138 (operating a user terminal 136 connected via network interface 138, and connected to handset 140, webcam 141 and executing client application 142), and user "Johannes" 144 (operating a user terminal 146 connected via network interface 148, and connected to handset 150, webcam 151 and executing client application 152).

The simplest method for sending the data stream to the four recipients is to set up four simultaneous one-to-one links from the publishing user terminal 104 to each of the recipient user terminals (116, 126, 136, 146). This enables the connections to be readily managed and by encrypting each link, the security and privacy of each of the users can be readily maintained.

However, establishing a plurality of one-to-one links in this manner can be inefficient in terms of network resource usage, and rapidly becomes unfeasible as more users are added to the multi-party communication. Resources such as uplink bandwidth and CPU load at the publishing user terminal rapidly reach capacity if several one-to-one links are established.

If, for example, the publishing user terminal 104 only has sufficient uplink bandwidth to send the data stream to two other user terminals, then it is clearly not possible to establish one-to-one links to all four of the recipients user terminals. This problem can be solved through the use of relay nodes, which may be selected by an optimization algorithm in order to best support the required distribution of the data stream.

Figure 4:
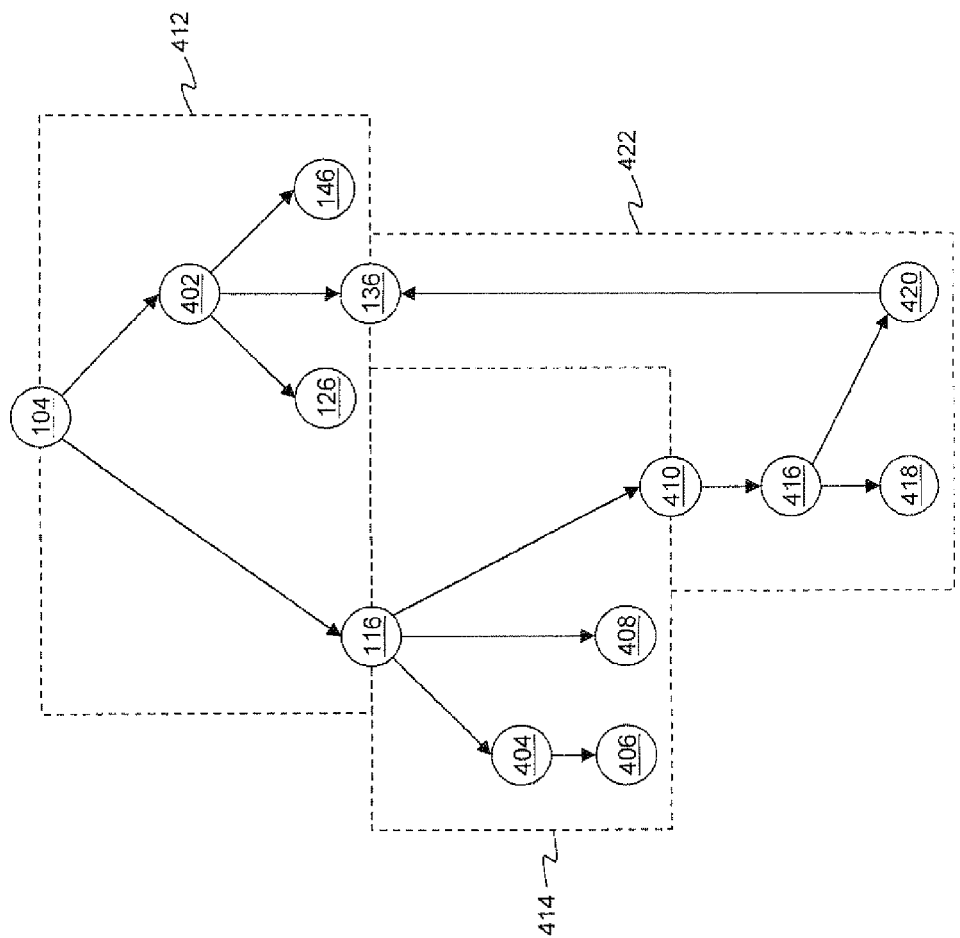
FIG. 4 shows an example group communication scenario.

This is illustrated in FIG. 4, where user terminal 104 only has enough uplink bandwidth to support two connections. A first connection is established between the publishing user terminal 104 and the recipient user terminal 116. A second connection is established between the publishing user terminal 104 and a relay node 402. The relay node 402 is selected because it has sufficient bandwidth and CPU resources to provide the data stream to the remaining three recipient user terminals (126, 136, 146). In this way, the data stream can be sent to all recipient user terminals, whilst utilizing the available resources efficiently.

Of course, many other permutations of relay allocation, routing and configuration are also possible, but the manner in which the optimum selection is chosen is out of the scope of this description.

The relay nodes can be recipients of the data stream themselves (called participant relay nodes), or selected from other user terminals that are not recipients (called non-participant relay nodes). Note that the relay nodes are preferably other user terminals of users of the packet-based communication system which are executing the communication client application.

In addition to the provision of relay nodes for the distribution of a data stream to a plurality of recipient user terminals, the packet-based communication system can also enable a situation in which it is possible for data streams to be "republished" to a new group of recipient user terminals by one of the original recipients.

For example, consider the case that a file is sent by user terminal 104 to each of the four recipient user terminals (116, 126, 136, 146) in FIG. 4. Recipient user terminal 116 can then take this file and send it to a new group of recipients, in this case user terminal 404, 406, 408 and 410. Note that user terminal 404 in FIG. 4 is an example of a participant relay node, in that it is both a recipient of the data stream, and also relays it onto an additional recipient (user terminal 406).

In this situation, the original user terminal 104 is called the "producer" of the data stream, as the content was produced at this terminal. User terminal 104 is also a "publisher" of the data stream, as user terminal 104 sends it to the first group of recipients. The first group of recipient user terminals 116, 126, 136 and 146 are called "consumers" of the data stream. The group comprising the publisher and the consumers constitute a first "audience" 412 for the data stream. The first audience 412 is therefore defined by the publisher and the user terminals to which the publisher sends the data stream.

The consumer user terminal 116 then becomes a publisher by republishing the data stream to a second audience 414 comprising consumer user terminals 404, 406, 408 and 410.

Further republications can also occur. For example, consumer 410 can choose to republish the data stream to consumers 418, 420 and 136 (via non-participant relay node 416) forming audience 422. Note that audience 422 comprises a consumer that was also a consumer in audience 412. Therefore, these two audiences are overlapping, and consumer 136 is receiving the same data stream from two different publishers (104 and 410).

The type of scenario outlined in FIG. 4, comprising non-participant relay nodes and republication of data streams, gives rise to several problems.

Firstly, there is the problem of how to be able to identify the original producer (e.g. 104) of the data stream, whilst also efficiently identifying and managing all of the individual audiences (e.g. 412, 414, 422) that the data stream is being sent to.

Secondly, there are problems with security and privacy. It is important that non-participant relay nodes (such as 402 and 416) are not aware of which data streams they are relaying to particular consumers. Furthermore, the privacy of the individual audiences must be maintained, such that, for example, the members of audience 414 should not be aware of the members of audience 412. In addition, because of the use of relay nodes to distribute the data stream, it is no longer possible to separately encrypt each link between two user terminals. This is because a single link from the publisher can subsequently branch out into several links to many consumer user terminals. Therefore, a publisher-based encryption model is required, rather than a link-based encryption.

Thirdly, there is the problem of how to efficiently keep track of the original data stream produced (by producer 104) and avoid many copies of the same data stream being reproduced unnecessarily. It is clearly inefficient for many copies of the same data stream to be sent over the network if the data is already available at certain user terminals.

Fourthly, there are routing problems to solve. A relay node needs to know where to route a particular data stream. This can be problematic if the relay node is a member of more than one audience, as the relay node needs to send the correct stream to the correct consumer.

Figure 5:
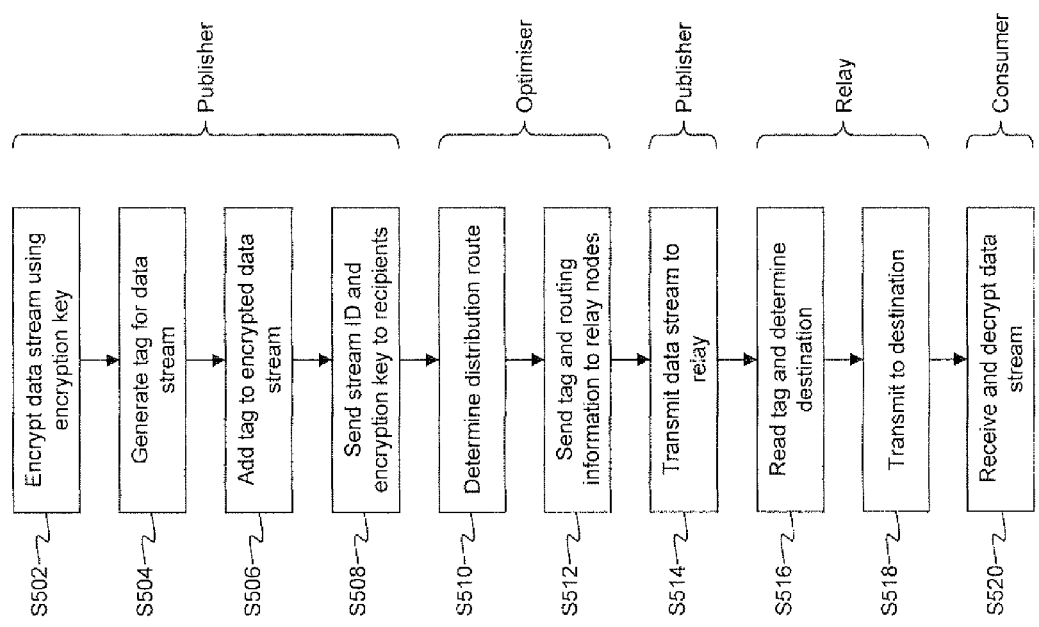
FIG. 5 shows a process for transmitting a data stream to a group of user terminals.

These problems solved by the process shown in FIG. 5. The process shown in FIG. 5 illustrates a method for transmitting a data stream from a publisher user terminal to a group of consumer user terminals. This process is explained with reference to audience 412 in FIG. 4.

The publisher 104 has a data stream that he wishes to send to the members of the audience 412 (i.e. consumers 116, 126, 136 and 146). When the data stream is created by the producer of the data stream, it is assigned a stream identifier. The stream ID is an identifier which uniquely identifies the content of the data stream (amongst all the other data streams that are sent over the packet-based communication network). By maintaining the integrity of the stream identifier throughout all subsequent publications of the data stream, the content of the data stream can be readily identified. Therefore, it can be readily determined whether a data stream comprises the same or different content from another data stream.

The stream ID is created by the producer of the data stream. Preferably, the stream ID is created by using a hash algorithm on the content of the data stream. This allows an identifier to be created by the producer without needing knowledge of any other existing streams or needing to communicate with any additional network entities.

The producer of the data stream can also be the publisher of the data stream (as in FIG. 4). However, the producer and publisher can also be separate. For example, publisher 104 can be provided with the stream by a separate producer.

Figure 6:
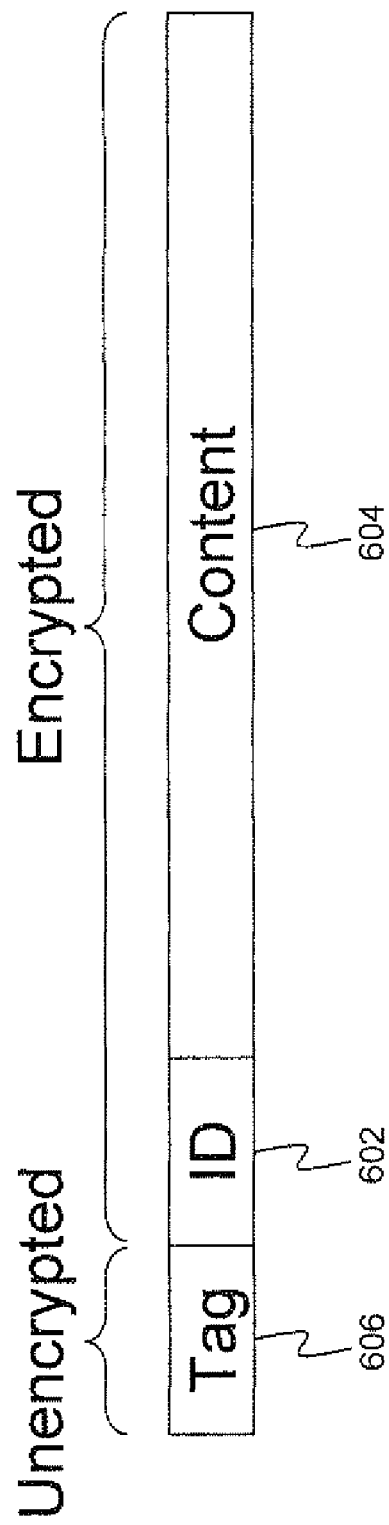
FIG. 6 shows the structure of a data stream.

The stream ID can be seen added to the content of the data stream in FIG. 6. Note that, although the stream ID 602 is shown pre-pended to the content 604 in FIG. 6, it will be appreciated that the stream ID can be added as a prefix, suffix or included within the data stream in any way.

In step S502, the publisher 104 encrypts the data stream (including the content 604 and the stream ID 602) using an encryption key. Therefore, the content 604 and the stream ID 602 will now only be able to be read by user terminals that know the encryption key, and can therefore decrypt the data stream. This is a publisher-based encryption model (also called content-based encryption), as there is a single encryption of the data stream for all the consumers. This is in contrast to link-based encryption, where each link to each consumer is encrypted separately. This is required for efficient distribution of the data stream to many user terminals.

In step S504, the publisher 104 generates an identifier called a tag. The tag is distinct from the stream ID 602. The tag is used to uniquely identify the audience that the publisher is sending the data stream to. Therefore, the audience and the content of the data stream can be separately identified using the tag and the stream ID.

The stream ID is not derivable from the tag. Preferably, the tag is generated by the publisher using a one-way function such as a hash function having the stream ID as an input. This ensures that the stream ID cannot be derived or recreated from the tag. Furthermore, because the stream ID is a unique identifier, the tag generated from the stream ID is also a unique identifier.

The hash function can also include further arguments. Preferably, the encryption key is used as an input to the hash function as well as the stream ID. This ensures that when a data stream is republished, a tag is generated that is different to other tags used for other audiences. Every time that the data stream is republished by a new publisher, it is encrypted with a different encryption key. Therefore, by generating the tag using a hash of the stream ID and the encryption key, a different tag is generated at each republication.

In alternative embodiments, the tag can be generated using other methods, not based on the stream ID or encryption key, for example generating a random tag value.

In step S506, the tag is added to the encrypted data stream. This is illustrated in FIG. 6, where the tag 606 is adjoined to the encrypted stream ID 602 and content 604. Note that although FIG. 6 illustrates the tag 606 pre-pended to the data stream, the tag 606 can be added anywhere, e.g. as a suffix, prefix or within the stream itself. Also note that whilst FIG. 6 shows only a single tag 606 and stream ID 602 associated with the content 604, the tag 606 and stream ID 602 can be repeated several times. This can particularly be the case if the content 604 is broken up into chunks of data, such as frames or packets, in which case the stream ID 602 and tag 606 can be adjoined to each data chunk.

It is important to note that the tag 606 remains unencrypted (i.e. can be read by any node) and the stream ID 602 and content 604 are encrypted (i.e. can only be read by nodes possessing the encryption key). Unencrypted data such as the tag is called plaintext or clear data.

At the end of step S506, the data stream (as shown in FIG. 6) is ready for transmission to the audience 412 of consumer user terminals. However, before this can be performed, the audience must be established and provided with appropriate information to enable it to receive the data stream.

In step S508, the publisher user terminal 104 transmits the stream ID and the encryption key to each of the consumer user terminals. This can be performed over individual, secure one-to-one links with each of the consumers. The quantity of data being sent is small, and hence one-to-one links are not inefficient to use, even for large numbers of consumers.

In preferred embodiments, the stream ID and encryption key is sent over a secure call establishment channel. The call establishment channel already exists in the packet-based communication system and is used for the exchange of information when establishing one-to-one communication (such as VoIP calls). Alternatively, any suitable secure data communication channel can be used to send the encryption key and stream ID.

Alternatively, the stream ID and encryption key can be sent over a secure multicast channel to each of the consumers. The secure multicast channel can be an instant messaging channel already present in the packet-based communication system.

The consumer user terminals are provided with the encryption key in this way in order to enable them to decrypt the data stream when it is received, thereby allowing them to view the content 604. The stream ID is provided to enable the consumer user terminals to verify that this corresponds to the stream ID encrypted in the data stream, and to check that they do not already have this content stored at the user terminal (in which case it need not be retransmitted to them).

In step S510 relay nodes are selected to send the data stream to consumer user terminals. An optimizer algorithm may be used to determine what route is to be used to send the data stream to the consumer user terminals. The precise operation of the optimizer is out of the scope of this description. However, the optimizer ultimately determines whether relay nodes are required, and which links need to be established between the consumers and relay nodes. For example, referring again to audience 412 in FIG. 4, the optimizer determines that a non-participant relay node 402 is required, and that this relay node 402 should send the data stream to consumers 126, 136 and 146.

The optimizer can reside in several possible locations. For example, a centralized optimizer can attempt to optimize data streams over the packet-based communication system. Alternatively, the optimizer can attempt to optimize data streams but be a distributed algorithm operating over the user terminals in the system.

In step S512, following the determination of the route for the data stream, routing information is provided to the relay nodes. The routing information comprises the tag and information on where a data stream having that tag should be sent. For example, referring to FIG. 4, the routing information sent to relay node 402 comprises the tag for audience 412 and instructions to send the data stream with this tag to specific consumer user terminals 126, 136 and 146.

Note that neither the stream ID nor the encryption key is provided to non-participant relay nodes.

This information is provided to the relays by the optimizer. However, it is also possible for this information to be reported to the publisher by the optimizer, and sent by the publisher to the relay nodes.

Following step S512, the route has been established and the consumers are ready to receive the data stream. Therefore, in step S514, the data stream is transmitted from the publisher user terminal 104 to the relay node 402. Note that in addition to transmitting the data stream to the relay node 402, the publisher 104 also sends the data stream to any consumer user terminals with which it is establishing a direct connection (e.g. consumer 116).

In step S516, the relay node 402 receives the data stream. The relay node reads the unencrypted tag 606 from the data stream. Using the routing information, the relay node determines where to transmit this data stream. For example, the relay node 402 can determine from the routing information that it needs to send the data stream to consumers 126, 136 and 146.

In step S518, the relay node 402 transmits the data stream to the appropriate consumer user terminals (126, 136, 146) in accordance with the routing information. In step S520, the consumer user terminals receive the data stream. The consumer user terminals decrypt the data stream using the encryption key provided to them in step S508. The consumer user terminals are then able to read the content 604 of the data stream and display it to the users. The consumer user terminals can also read the decrypted stream ID and verify that it corresponds to that sent in S508.

If one of the consumers (e.g. consumer 116) republishes the data stream, then the process in FIG. 5 is performed again. This means that the data stream is encrypted by new publisher 116 with a new encryption key and the new publisher generates a new, different tag for audience 414. However, the stream ID is maintained the same.

Only the new audience 414 has access to the new encryption key. Therefore, the old audience 412 is not able to decrypt and view the data stream sent by the new publisher 116. Privacy between audiences is also maintained, even though different audiences are consuming the same stream. For example, the consumers of audience 412 have no way of knowing who the consumers of audience 414 are. This is because the only information that is visible (i.e. unencrypted) in the data streams is the tag, and this cannot be used to derive the stream ID. Therefore, a member of another audience cannot determine the identity of a stream (in the same way that a non-participant relay node cannot determine this).

Furthermore, by maintaining the stream ID regardless of how many times the data stream is republished, the efficiency of the network can be increased. For example, as shown in FIG. 4, consumer 136 is a member of both audience 412 and audience 422. Therefore consumer 136 is receiving the data stream from two different publishers (104 and 410) who are unaware of this (due to privacy between audiences). Assuming that consumer 136 has already received the data stream from publisher 104 (as part of audience 412), then when publisher 410 informs consumer 136 of the stream ID (along with the encryption key in S508), the consumer 136 can determine that this data stream is already present at this user terminal, and does not need to be received again. Therefore, network resources can be saved by not transmitting a copy of a data stream when a user terminal already has the data. Of course, if the content of the two streams was not the same, then the stream IDs would be different, and in this case consumer 136 would receive the data stream.

In addition, the use of distinct tags and stream IDs can also solve routing problems. For example, if a single non-participant relay node happens to be selected to relay data streams in two different audiences of the same data stream, then the tags can ensure that the correct data stream is routed to the correct audience. This is important because the data streams are encrypted with a different key for each audience. Therefore, although the content is the same for each, an audience can only decrypt its particular data stream. If only the stream ID were used to identify the stream, then a common relay node such as this could not distinguish which stream to send to which audience. This situation can also occur in the case that a user terminal is a consumer in one audience, and a non-participant relay node for another audience. These scenarios are possible in the case that the relay node has a large amount of available bandwidth and CPU resources.

Therefore, by using the above-described process, the problems of privacy, content management and audience management are solved. In particular, because the tag generated by the publisher is distinct from the stream ID assigned by the producer, this enables the tag to identify the group of consumers receiving the data stream, i.e. the audience of the data stream, whilst maintaining the stream ID, which identifies the content of the data stream. This allows the same content to be consistently and uniquely identified regardless of how many times it is republished to different audiences at different times. Therefore, the audience of the data stream can be identified and managed independently of the content.

Furthermore, because a relay node is only able to access the tag (due to not having the encryption key), the stream ID is not known to the relay node. As the tag is distinct from the stream ID, this prevents the relay node from knowing the identity of the stream that is being sent to the consumers. Therefore, as the relay node is a not a consumer (i.e. is a non-participant relay node), this maintains the privacy of the consumer user terminals to which the data stream is being routed. In addition, because the tag is generated using a one-way function (such as a hash function), the stream ID cannot be derived from the tag. This ensures that the relay node is not able to derive the stream ID from the tag, thereby preserving the privacy requirements of the consumer user terminals.

Hence, by maintaining one persistent, encrypted stream identifier for the content of a given data stream, and generating a new, unencrypted tag for each audience that the data stream is sent to, the distribution of the data stream over a large number of audiences can be managed efficiently and simply, whilst maintaining the privacy of the audience members.

While this invention has been particularly shown and described with reference to preferred embodiments, it will be understood to those skilled in the art that various changes in form and detail may be made without departing from the scope of the invention as defined by the appendant claims.

For example, as an alternative to generating the stream ID from a hash of the content of the data stream, the stream ID can be determined by the producer obtaining an identity from a directory of available stream identities. Such a directory can take the form of a centralized database or a distributed database. Alternatively, the stream ID can be a randomly generated identifier.

In a further alternative embodiment, the stream ID is created from a hash of metadata associated with the content. For example, a metadata block for a data stream is created with a generated public key in it, and the stream ID is created as a hash of the metadata. Each block of data in the stream is signed with a private key corresponding to the public key in the metadata. Receivers of the data stream can then verify the metadata against the hash in the stream ID and verify the blocks of data against the public key in the metadata.

Note that, whilst it is preferable for the stream ID to be added to the data stream (as in FIG. 6), in alternative embodiments the stream ID does not need to be included in the data stream, but can instead be stored in association with the data stream, for example in a look-up table.

Note also that the tag itself does not have to be included in the data stream (as in FIG. 6). In alternative embodiments, the tag can be indirectly associated with the data stream. For example, a node (e.g. an optimizer node) can inform the publisher and consumer nodes that a data stream having a particular index corresponds to a certain tag. In this way, the data stream would only be accompanied by the index.

In an alternative embodiment, transmitting the stream ID to the consumer user terminals from the publisher user terminal (S508 in FIG. 5) can be omitted if the stream ID can be derived autonomously by the consumer user terminals. For example, the stream ID can be created by the publisher user terminal as a combination of the publisher's username, the consumer's usernames and a sequence number. The client of the consumer user terminal can therefore generate the stream ID as it knows the username information and the last sequence number received from this publisher.

In one embodiment of the invention, the publisher may be a server. For example, the server may be arranged to store media data and to publish the media data as data streams to recipient nodes. Data streams may be published to recipient nodes in response to a request from a node.

In one embodiment of the invention, a relay node may be a server. In the case where the relay node is arranged to relay data streams to more than one node this may advantageously use the bandwidth and processing resources available to the server.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method comprising:
generating a data stream for receipt by a group of recipient nodes, the data stream being associated with a first identifier that indicates that content of the data stream is from a producer of the data stream;
generating a second identifier, the second identifier being distinct from the first identifier;
encrypting the data stream using an encryption key to generate an encrypted data stream;
associating the second identifier in an unencrypted form with the encrypted data stream to identify that the encrypted data stream is to be received by the group of recipient nodes;
transmitting routing information comprising the second identifier in an unencrypted form for receipt by an intermediate node to enable the intermediate node to forward the encrypted data stream to one or more recipient nodes of the group of recipient nodes; and
transmitting the encrypted data stream for receipt by the intermediate node.

2. A method according to claim 1, wherein the recipient nodes are end-user nodes.

3. A method according to claim 1, wherein the recipient nodes are consuming end-user nodes being consumers of said data stream.

4. A method according to claim 1, wherein the intermediate node is an end-user node.

5. A method according to claim 4, wherein the intermediate node is a consuming end-user node being a consumer of said data stream.

6. A method according to claim 5, wherein the intermediate node is designated by the second identifier as a consumer of the data stream.

7. A method according to claim 1, wherein the second identifier identifies the one or more recipient nodes as being consumers of said data stream, but does not identify the intermediate node as a consumer of said data stream.

8. A method according to claim 1, wherein the source node is an end-user node.

9. A method according to claim 1 wherein the intermediate node is a server.

10. A method according to claim 1, wherein the source node is a server.

11. A method according to claim 1, wherein the second identifier is associated with the encrypted data stream as at least one of plaintext or clear data.

12. A method according to claim 1, further comprising transmitting the encryption key to the group of recipient nodes.

13. A method according to claim 1, wherein the producer of the data stream is different than a publisher of the data stream.

14. A method according to claim 1, wherein the second identifier is generated using a function having the first identifier as a first input.

15. A method according to claim 14, wherein the function further has the encryption key as a second input.

16. A method according to claim 14, wherein the function is a one-way function, such that the first identifier cannot be derived from the second identifier.

17. A method according to claim 16, wherein the one-way function is a hash function.

18. A method according to claim 1, further comprising transmitting the first identifier to the group of recipient nodes.

19. A method according to claim 18, wherein transmitting the first identifier to the group of recipient nodes comprises transmitting the first identifier to the group of recipient nodes over individual secure channels separate from the transmission of the encrypted data stream.

20. A method according to claim 19, wherein the secure channels are call-establishment channels.

21. A method according to claim 18, wherein transmitting the first identifier to the group of recipient nodes comprises transmitting the first identifier to the group of recipient nodes over a secure multicast channel separately from the transmission of the encrypted data stream.

22. A method according to claim 21, wherein the secure multicast channel is an instant messaging channel.

23. A method according to claim 1, further comprising responsive to receiving the first identifier at the group of recipient nodes, one or more of the recipient nodes determining whether a pre-existing data stream having the first identifier is already stored, and, if so, the respective recipient node sending a message to a source node such that the data stream is not transmitted to the respective recipient node.

24. A method according to claim 1, further comprising:
one of the recipient nodes selecting to re-transmit the data stream to a group of further recipient nodes;
the one of the recipient nodes generating a third identifier, wherein the third identifier is distinct from both the first identifier and second identifier, associating the third identifier with the data stream to identify that the data stream is to be received by the group of further recipient nodes;
transmitting further routing information comprising the third identifier to a further intermediate node;
transmitting the data stream comprising the third identifier from the one of the recipient nodes to the further intermediate node.

25. A method according to claim 1, wherein the method is implemented via at least one user terminal executing a communication client application.

26. A method according to claim 1, wherein the data stream comprises at least one of: video data; audio data; image data; or text data.

27. A method according to claim 1, wherein the routing information and the encrypted data stream are transmitted via an overlay network operating on the internet.

28. A method according to claim 1, wherein the routing information and the encrypted data stream are transmitted via a peer-to-peer overlay network.

29. A communication client program product embodied on a computer-readable storage device, the program product comprising program code which when executed by a computing device, causes the computing device to perform steps of:
associating a first identifier with a data stream, the first identifier indicating that content of the data stream is from a producer of the data stream;
generating a second identifier that is distinct from the first identifier;
encrypting the data stream using an encryption key to generate an encrypted data stream;
associating the second identifier in an unencrypted form with the encrypted data stream to identify that the encrypted data stream is to be received by a group of recipient nodes;
transmitting routing information comprising the second identifier in an unencrypted form for receipt by an intermediate node to enable the intermediate node to forward the encrypted data stream to one or more recipient nodes of the group of recipient nodes;
transmitting the encrypted data stream for receipt by the intermediate node.

30. A system comprising:
at least one processor;
one or more computer-readable storage devices storing instructions that are executable by the at least one processor to cause the system to:
associate a data stream with a first identifier that identifies a producer of the data stream;
generate a second identifier that is distinct from the first identifier and that identifies that the data stream is to be received by a group of recipient nodes;
encrypt the data stream using an encryption key to generate an encrypted data stream;
associate the second identifier in an unencrypted form with the encrypted data stream;
transmit the second identifier in an unencrypted form for receipt by an intermediate node to enable the intermediate node to forward the encrypted data stream to one or more recipient nodes of the group of recipient nodes;
transmit the encrypted data stream for receipt by the intermediate node.

* * * * *